Figure 1:
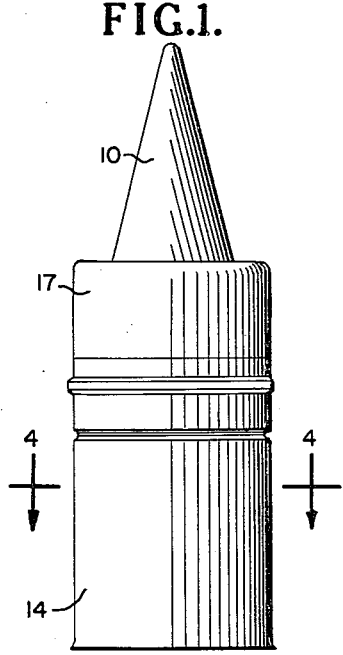

Oct. 24, 1961  S. P. PROSEN ET AL  3,005,408
PLASTICS SABOT
Filed Feb. 5, 1960

INVENTORS.
S. P. PROSEN
F. R. BARNET

BY

ATTORNEYS

United States Patent Office 3,005,408
Patented Oct. 24, 1961

3,005,408
PLASTICS SABOT
Stanley P. Prosen, Lanham, and Fredrick R. Barnet, Kensington, Md., assignors to the United States of America as represented by the Secretary of the Navy
Filed Feb. 5, 1960, Ser. No. 7,066
4 Claims. (Cl. 102—93)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application of Stanley P. Prosen and Fredrick R. Barnet, Serial No. 712,283, filed January 30, 1958, now Patent No. 2,983,224, for a Plastics Sabot and relates to an improved structure.

In the plastics sabot of the application Serial No. 712,283, the basic body portion of the sabot was completely covered by a thin shell. This shell was formed of a thermoplastic resin and was deformable to the extent that it was easily engraved by the gun rifling. The basic sabot was formed of a thermosetting resin which was hard and resistant to abrasion. In the composite sabot of the original application the thin-walled shell substantially covered the body portion, and the bourrelet, that part of the projectile which rides on the lands of the rifling, was part of this thin walled shell and due to the resiliency of the thermoplastic material making up the thin walled shell, the projectile balloted (any deviation from a straight line course while in the gun barrel may be termed balloting) and the accuracy of the projectile was adversely affected.

The basic sabot in the original application was grooved longitudinally to provide a mechanical connection between the basic body portion and the thin walled shell. This provided a keying between the two sections and insured the rotation of the projectile. The grooving was also employed to assist in the breakup of the sabot upon leaving the gun. These grooves divided the sabot into longitudinal sections.

It is an object of this invention to provide a two piece sabot formed of an inner basic body of a thermosetting resin and an outer thin walled shell partially covering the body portion and formed of a thermoplastic resin.

It is another object of this invention to provide a sabot having a basic body portion which is grooved both longitudinally and annularly to form sections joined together by comparatively easily ruptured webs.

It is a further object to provide a two piece plastics sabot formed of thermosetting and thermoplastics resins wherein the bourrelet is part of the hard thermosetting resin and the deformable portion adapted to engage and to be engraved by the gun rifling is formed of the thermoplastics resin.

It is a further object of the invention to provide a two piece plastics sabot which is designed to break free of the projectile upon emerging from the gun without disturbing the accuracy of flight of the projectile.

Figure 2:
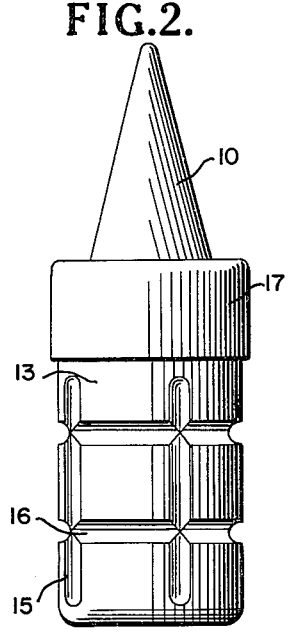
Figure 3:
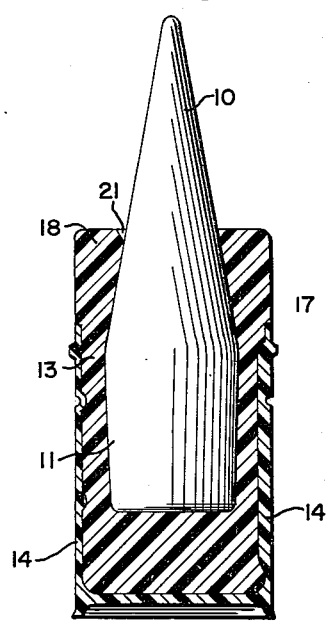
Figure 4:
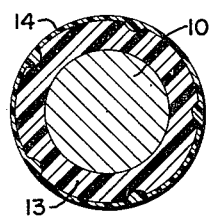

Other objects and many of the attendant advantages of this invention will be readily appreciated as the same becomes better understood by reference to the following detailed description when considered in connection with the accompanying drawing wherein:

FIG. 1 is a front elevation of the projectile and sabot;
FIG. 2 is a similar view before the thermoplastic shell is affixed;
FIG. 3 is a longitudinal section; and
FIG. 4 is a cross-section on lines 4—4 of FIG. 1.

Referring to the drawing wherein like numerals designate like parts in the several figures, a projectile comprising a penetrating slug having a conical forward section 10 and a cylindrical rearward section 11 is illustrated with a sabot. The shell section containing the propellant (not shown) forms no part of the present invention. The sabot which constitutes the invention is an improvement on the sabot of the patent application above-mentioned and is formed with a basic body portion 13 of thermosetting resin and an outer thin-walled shell 14 formed of a thermoplastic resin.

The body portion is formed with longitudinal grooves 15 and annular grooves 16 and with an enlarged cylindrical section 17 which serves as a bourrelet.

The grooves 16 and 17 are filled with thermoplastic resin when the thin wall shell is applied and this provides a mechanical driving connection to impart rotary movement of the thin wall shell to the body portion of the sabot. Molded integral with the thin walled shell is an annular band of a diameter slightly larger than the bourrelet to engage the rifling of the gun. The thin-walled shell of thermoplastic resin is easily engraved by the rifling of the gun so that in the passage of the projectile through the gun the rifling grooves will engrave the band portion of the shell and impart a rotary motion to the projectile. The bourrelet, when the projectile is fired, rides on the lands of the rifling which act as a bearing surface and prevent balloting of the projectile while in the gun barrel. Because of the physical properties of the thermosetting resin the bourrelet section 17 will ride smoothly on the lands of the rifling and will hold the projectile on a straight course. Tests conducted with this type of construction demonstrate a greater accuracy in hitting targets, particularly at long range.

This improved accuracy is attributed to the absence of balloting of the projectile during travel in the gun. The use of the thermosetting resin to form the bourrelet provides a hard bearing surface which rides smoothly on the lands of the rifling and renders the projectile highly effective.

The forward portion of the body portion is spaced from the conical portion 10 of the slug to provide an annular collar 18. This forms an annular well 21 which will trap the rush of air due to the forward motion of the projectile.

The pressure inserted by this trapped air acting against the sides of the wall cause the sabot to break up during free flight. The stresses within the body of the sabot, caused by the compression of the gases from the ignited explosive and the spinning of the projectile contribute to this break-up of the sabot. The grooves 16 and 17 insures this break-up along regular lines so that the flight of the penetrating slug is not disturbed.

Obviously many modifications and variations of the present invention are possible in the light of the above teachings. It is therefore to be understood, that within the scope of the appended claims, the invention may be practiced otherwise than as specifically described.

What is claimed and desired to be secured by Letters Patent of the United States is:

1. A two piece plastic sabot for a projectile having a slug, said sabot comprising a basic body portion of a thermosetting resin molded onto a slug, said body portion being substantially cylindrical and having one end portion of enlarged diameter to provide a bourrelet, and a thin walled external shell of a thermoplastics resin molded about but not adhering to that portion of the body not forming the bourrelet, a portion of said shell being of a thickness to increase the diameter of the body portion and shell to be greater than the diameter of the bourrelet.

2. A two piece sabot according to claim 1 where the basic body portion is formed with external grooves and the thin wall shell formed with protuberances filling said grooves to provide mechanical driving contact between said body portion and said shell, said thin wall shell being completely free of any adhesion to said body portion.

3. A two piece sabot according to claim 2 wherein said external grooves are longitudinal and annular of said body portion.

4. A two piece plastic sabot according to claim 1 wherein the portion of the thin walled shell of increased diameter is an integral annular band of a width not greater than the bourrelet.

References Cited in the file of this patent
UNITED STATES PATENTS
2,820,412    Beeuwkes et al. _____ Jan. 21, 1958